(12) United States Patent
Tsai et al.

(10) Patent No.: US 12,290,917 B2
(45) Date of Patent: May 6, 2025

(54) OBJECT POSE ESTIMATION SYSTEM, EXECUTION METHOD THEREOF AND GRAPHIC USER INTERFACE

(71) Applicant: INDUSTRIAL TECHNOLOGY RESEARCH INSTITUTE, Hsinchu (TW)

(72) Inventors: Dong-Chen Tsai, Miaoli (TW); Ping-Chang Shih, Yuanlin (TW); Yu-Ru Huang, Hualien (TW); Hung-Chun Chou, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 593 days.

(21) Appl. No.: 17/505,041

(22) Filed: Oct. 19, 2021

(65) Prior Publication Data
US 2022/0362945 A1 Nov. 17, 2022

(30) Foreign Application Priority Data
May 14, 2021 (TW) ................... 110117478

(51) Int. Cl.
*G06K 9/00* (2022.01)
*B25J 9/16* (2006.01)
(Continued)

(52) U.S. Cl.
CPC ............. *B25J 13/089* (2013.01); *B25J 9/163* (2013.01); *G06T 1/0014* (2013.01); *G06T 7/73* (2017.01);
(Continued)

(58) Field of Classification Search
CPC . G06T 2207/10028; G06T 2207/20084; G06T 2207/20081; B25J 9/1697
See application file for complete search history.

(56) References Cited

U.S. PATENT DOCUMENTS 8,295,556 B2   10/2012  Ohtani et al.
8,994,723 B2 *  3/2015  Drost .................... G06V 20/64
                                               345/419
(Continued)

FOREIGN PATENT DOCUMENTS

CN    109483554 A    3/2019
CN    110691676 A    1/2020
(Continued)

OTHER PUBLICATIONS

Drost et al., "Model Globally, Match Locally: Efficient and Robust 3D Object Recognition," Proceedings—IEEE Computer Society Conference on Computer Vision and Pattern Recognition, Jul. 2010, 8 pages total.
(Continued)

*Primary Examiner* — Gregory A Morse
*Assistant Examiner* — Owais Iqbal Memon
(74) *Attorney, Agent, or Firm* — Birch, Stewart, Kolasch & Birch, LLP

(57) ABSTRACT

An object pose estimation system, an execution method thereof and a graphic user interface are provided. The execution method of the object pose estimation system includes the following steps. A feature extraction strategy of a pose estimation unit is determined by a feature extraction strategy neural network model according to a scene point cloud. According to the feature extraction strategy, a model feature is extracted from a 3D model of an object and a scene feature is extracted from the scene point cloud by the pose estimation unit. The model feature is compared with the scene feature by the pose estimation unit to obtain an estimated pose of the object.

22 Claims, 12 Drawing Sheets

(51) Int. Cl.
*B25J 13/08* (2006.01)
*G06T 1/00* (2006.01)
*G06T 7/73* (2017.01)

(52) U.S. Cl.
CPC ............... *G06T 2207/10028* (2013.01); *G06T 2207/20084* (2013.01); *G06T 2207/30164* (2013.01)

(56) References Cited

U.S. PATENT DOCUMENTS

| | | | |
|---|---|---|---|
| 10,207,402 B2 | 2/2019 | Levine et al. | |
| 10,500,727 B1* | 12/2019 | Hinterstoisser | G06F 30/00 |
| 10,572,775 B2 | 2/2020 | Greenberg | |
| 10,717,196 B2 | 7/2020 | Yamazaki et al. | |
| 2019/0272558 A1* | 9/2019 | Suzuki | G06N 7/01 |
| 2019/0381670 A1 | 12/2019 | Correll et al. | |
| 2022/0288783 A1* | 9/2022 | Sundermeyer | G06T 7/55 |
| 2022/0343537 A1* | 10/2022 | Taamazyan | G06V 10/82 |
| 2023/0368414 A1* | 11/2023 | Afrooze | G06N 3/08 |

FOREIGN PATENT DOCUMENTS

| | | |
|---|---|---|
| CN | 111015662 A | 4/2020 |
| CN | 111381499 A | 7/2020 |
| TW | 201928869 A | 7/2019 |
| TW | 202026958 A | 7/2020 |

OTHER PUBLICATIONS

Han et al., "3D Point Cloud Descriptors in Hand-crafted and Deep Learning Age: State-of-the-Art," arXiv:1802.02297v2, Jul. 27, 2020, pp. 1-35.

Marton et al., "General 3D Modelling of Novel Objects from a Single View," The 2010 IEEE/RSJ International Conference on Intelligent Robots and Systems, Taipei, Taiwan, Oct. 18-22, 2010, pp. 3700-3705.

Rusu et al., "Aligning Point Cloud Views using Persistent Feature Histograms," 2008 IEEE/RSJ International Conference on Intelligent Robots and Systems, Nice, France, Sep. 22-26, 2008, pp. 3384-3391.

Rusu et al., "Fast 3D Recognition and Pose Using the Viewpoint Feature Histogram," The 2010 IEEE/RSJ International Conference on Intelligent Robots and Systems, Taipei, Taiwan, Oct. 18-22, 2010, pp. 2155-2162.

Tombari et al., "Unique Signatures of Histograms for Local Surface Description," ECCV 2010: Computer Vision—ECCV 2010, 2010, pp. 356-369.

Taiwanese Office Action and Search Report for Taiwanese Application No. 110117478, dated Jan. 27, 2022.

* cited by examiner

SN6

SN7

OBJECT POSE ESTIMATION SYSTEM, EXECUTION METHOD THEREOF AND GRAPHIC USER INTERFACE

This application claims the benefit of Taiwan application Serial No. 110117478, filed May 14, 2021, the disclosure of which is incorporated by reference herein in its entirety.

TECHNICAL FIELD

The disclosure relates in general to an object pose estimation system, an execution method thereof and a graphic user interface.

BACKGROUND

In many industries (such as the metal processing industry), workpiece/object needs to be unloaded from a preparation basket and be loaded to a processing machine for processing (such as drilling, grinding, and cleaning). Currently, the materials are normally loaded/unloaded manually. However, as the labor shortage is getting more and more severe, the automation of material loading/unloading has become an important goal in industry 4.0.

The automation of material loading/unloading could be implemented by a robot arm. However, to correctly grasp an object, the robot arm needs an accurate and fast 3D object pose estimation technology. When the scenes are different, most of the current 3D object pose estimation technologies still adopt the same feature extraction strategy, therefore the 3D object pose estimation accuracy and speed cannot be increased. Even a professional engineer with an image processing background still needs to continuously adjust the feature extraction strategy. Such an entry barrier is indeed too difficult to many industries such as water hardware industry and metal hand tool industry. Moreover, when the current object pose estimation technology is used, even a professional engineer still needs to continuously adjust the feature extraction strategy, which is very time consuming, and the production lines or workpieces cannot be promptly shifted.

SUMMARY

The present disclosure relates to an object pose estimation system, an execution method thereof and a graphic user interface.

According to one embodiment, an execution method of the object pose estimation system is provided. The execution method of the object pose estimation system includes the following steps. A feature extraction strategy of a pose estimation unit is determined by a feature extraction strategy neural network model according to a scene point cloud. According to the feature extraction strategy, a model feature is extracted from a 3D model of an object and a scene feature is extracted from the scene point cloud by the pose estimation unit. The model feature is compared with the scene feature by the pose estimation unit to obtain an estimated pose of the object.

According to another embodiment, an object pose estimation system is provided. The object pose estimation system includes a feature extraction strategy neural network model and a pose estimation unit. The feature extraction strategy neural network model is configured to determine a feature extraction strategy of a pose estimation unit according to a scene point cloud. The pose estimation unit is configured to extract a model feature from a 3D model of an object and extract a scene feature from the scene point cloud according to the feature extraction strategy. The pose estimation unit is configured to compare the model feature with the scene feature to obtain an estimated pose of the object.

According to an alternate embodiment, a graphic user interface is provided. The graphic user interface includes a scene point cloud input window, a feature extraction strategy determination window, a 3D model input button, and an estimated pose display window. The scene point cloud input window is used for showing a scene point cloud. A feature extraction strategy neural network model determines a feature extraction strategy of a pose estimation unit according to a scene point cloud and further displays the feature extraction strategy of a pose estimation unit on the feature extraction strategy determination window. The 3D model input button is used for inputting a 3D model of an object. A model feature is extracted from the 3D model and a scene feature is extracted from the scene point cloud according to the feature extraction strategy. The estimated pose display window is used for displaying an estimated pose of the object. The estimated pose is obtained by comparing the model feature with the scene feature.

The above and other aspects of the invention will become better understood with regard to the following detailed description of the preferred but non-limiting embodiment(s). The following description is made with reference to the accompanying drawings.

Figure 1:
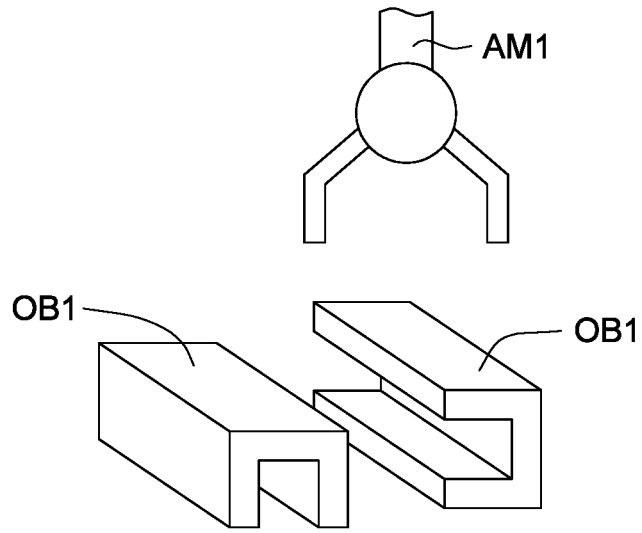
FIG. 1 is a schematic diagram of several objects and a robot arm according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Referring to FIG. 1, a schematic diagram of several objects OB1 and a robot arm AM1 according to an embodiment is shown. In some application contexts, the robot arm AM1 could grasp the object OB1 to complete an automatic material loading/unloading procedure. For the robot arm AM1 to more accurately grasp the objects OB1, the object pose estimation procedure must be correctly completed.

Figure 2:
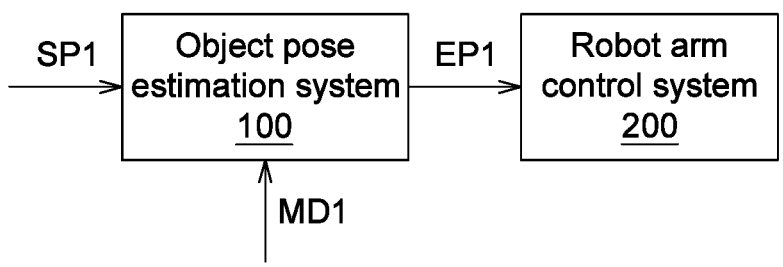
FIG. 2 is a schematic diagram of an object pose estimation system and a robot arm control system.

Referring to FIG. 2, a schematic diagram of an object pose estimation system 100 and a robot arm control system 200 is shown. After receiving a scene point cloud SP1 and a 3D model MD1, the object pose estimation system 100 performs the object pose estimation procedure to output an estimated pose EP1 of the object OB1 (illustrated in FIG. 1). After receiving the estimated pose EP1, the robot arm control system 200 could accurately control the robot arm AM1 to grasp the objects OB1.

During the object pose estimation procedure, feature extraction needs to be performed on the scene point cloud SP1 and the 3D model MD1 The 3D model MD1 is a standard 3D CAD model established for the object OB1 (illustrated in FIG. 1) in advance and remains unchanged, but the scene has a lot of changes.

Figure 3:
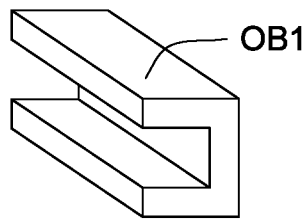
FIG. 3 is a schematic diagram of a scene according to an embodiment.
Figure 3:
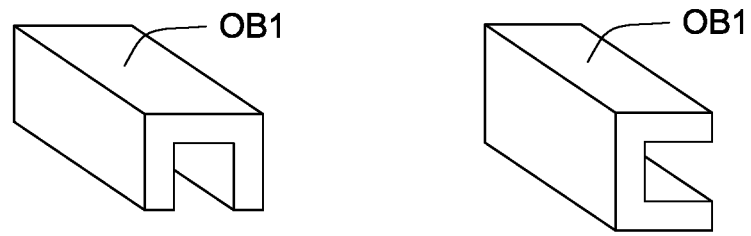
Figure 4:
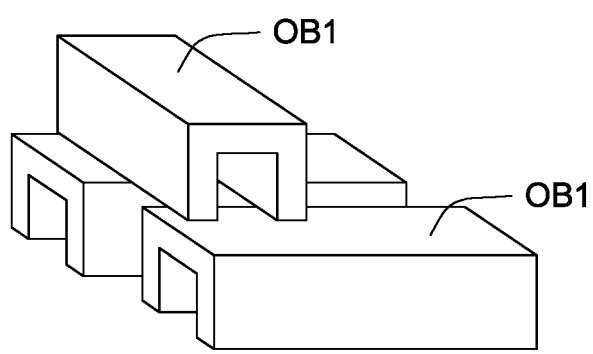
FIG. 4 is a schematic diagram of a scene according to another embodiment.
Figure 5:
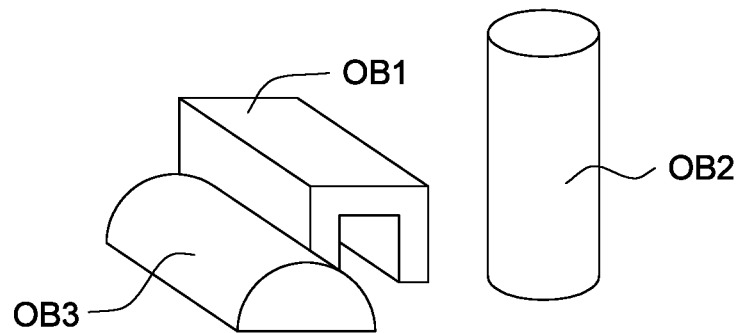
FIG. 5 is a schematic diagram of a scene according to another embodiment.
Figure 6:
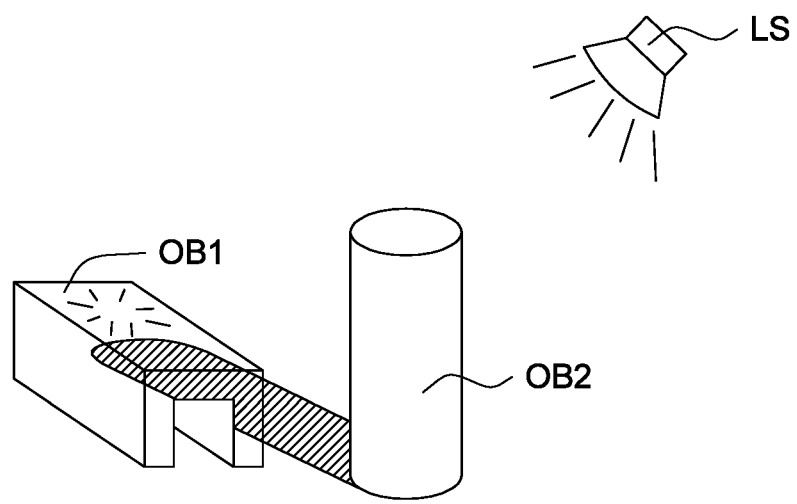
FIG. 6 is a schematic diagram of a scene according to another embodiment.

Referring to FIG. 3, a schematic diagram of a scene SN1 according to an embodiment is shown. As indicated in scene SN1, the objects OB1 are sparsely arranged without any overlaps. Referring to FIG. 4, a schematic diagram of a scene SN2 according to another embodiment is shown. As indicated in scene SN2, the objects OB2 are more densely arranged with several overlaps. Referring to FIG. 5, a schematic diagram of a scene SN3 according to another embodiment is shown. The scene SN3 contains different objects OB1, OB2 and OB3. Referring to FIG. 6, a schematic diagram of a scene SN4 according to another embodiment is shown. As indicated in the scene SN4, the light source LS irradiates the object OB1 and the object OB2, the object OB1 reflects the light, and the shade of the object OB2 is projected on the object OB1. To perform the object pose estimation procedure on the object OB1 in the scenes SN1 to SN4, suitable feature extraction strategies need to be applied on the scene point cloud SP1 and the 3D model MD1. The feature extraction strategy may consider factors such as estimation accuracy, computational complexity or a combination thereof. In the present embodiment, different feature extraction strategies are used for the scenes SN1 to SN4. The feature extraction strategy is determined using the neural network technology. Details of obtaining a feature extraction strategy and further performing an object pose estimation procedure by the object pose estimation system 100 according to the obtained feature extraction strategy to obtain an estimated pose are disclosed below.

Figure 7:
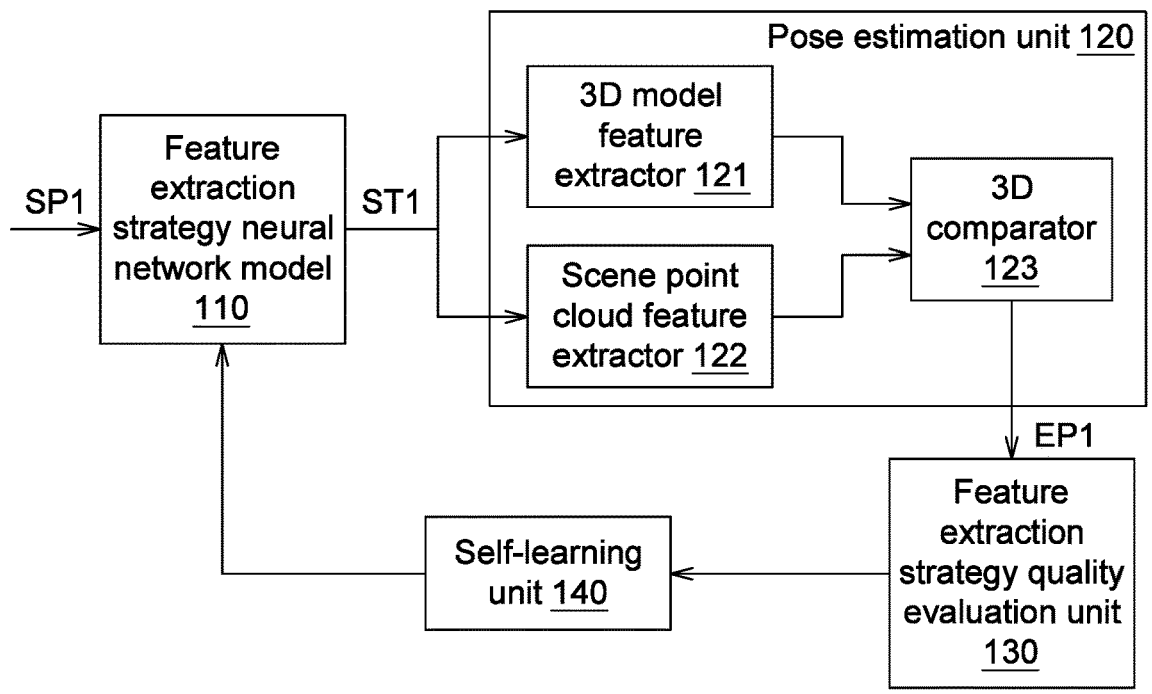
FIG. 7 is a block diagram of an object pose estimation system according to an embodiment.

Referring to FIG. 7, a block diagram of an object pose estimation system 100 according to an embodiment is shown. The object pose estimation system 100 includes a feature extraction strategy neural network model 110, a pose estimation unit 120, a feature extraction strategy quality evaluation unit 130 and a self-learning unit 140. The pose estimation unit 120 includes a 3D model feature extractor 121, a scene point cloud feature extractor 122 and a 3D comparator 123. The feature extraction strategy neural network model 110, the pose estimation unit 120, the 3D model feature extractor 121, the scene point cloud feature extractor 122, 3D comparator 123, the feature extraction strategy quality evaluation unit 130 and the self-learning unit 140 could be realized by such as a circuit, a chip, a circuit board, array code or storage device for storing programming code. The object pose estimation system 100 performs an on-line object pose estimation procedure adopting the feature extraction strategy neural network model 110 and the pose estimation unit 120. During the object pose estimation procedure, different feature extraction strategies ST1 could be used according to the scenes. Besides, the object pose estimation system 100 could perform an off-line training procedure on the feature extraction strategy neural network model 110 using the feature extraction strategy quality evaluation unit 130 and the self-learning unit 140, such that the feature extraction strategy neural network model 110 could provide a most suitable feature extraction strategy ST1. Detailed operations of each element are disclosed below with an accompanying flowchart.

Figure 8:
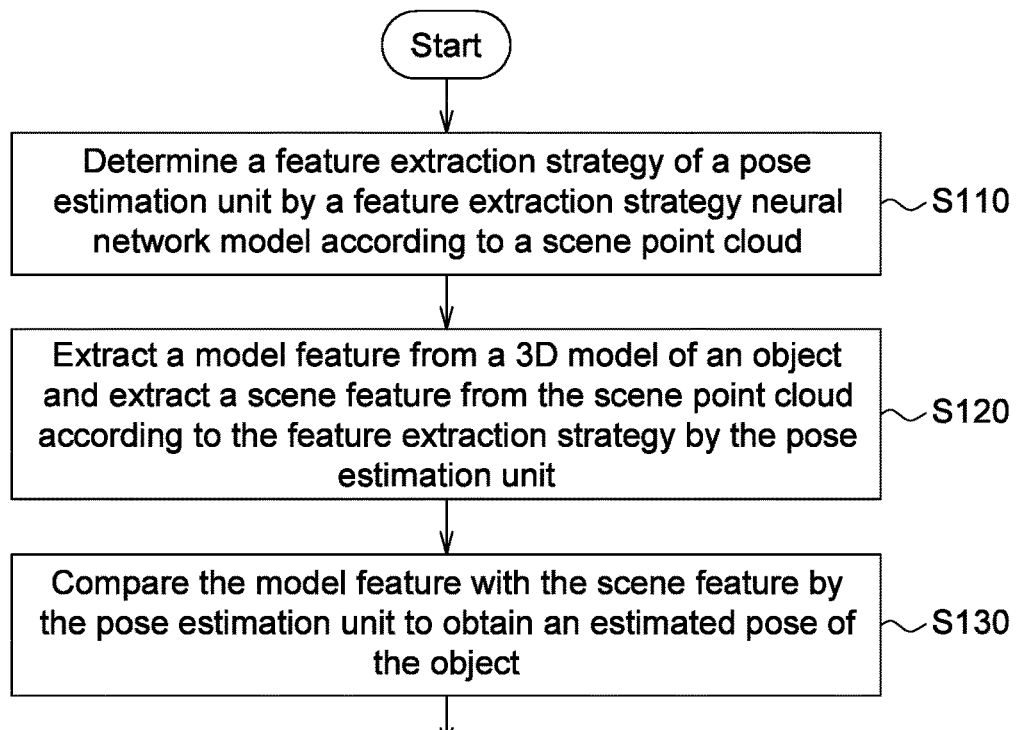
FIG. 8 is a flowchart of an object pose estimation procedure of an execution method of an object pose estimation system according to an embodiment.
Figure 9:
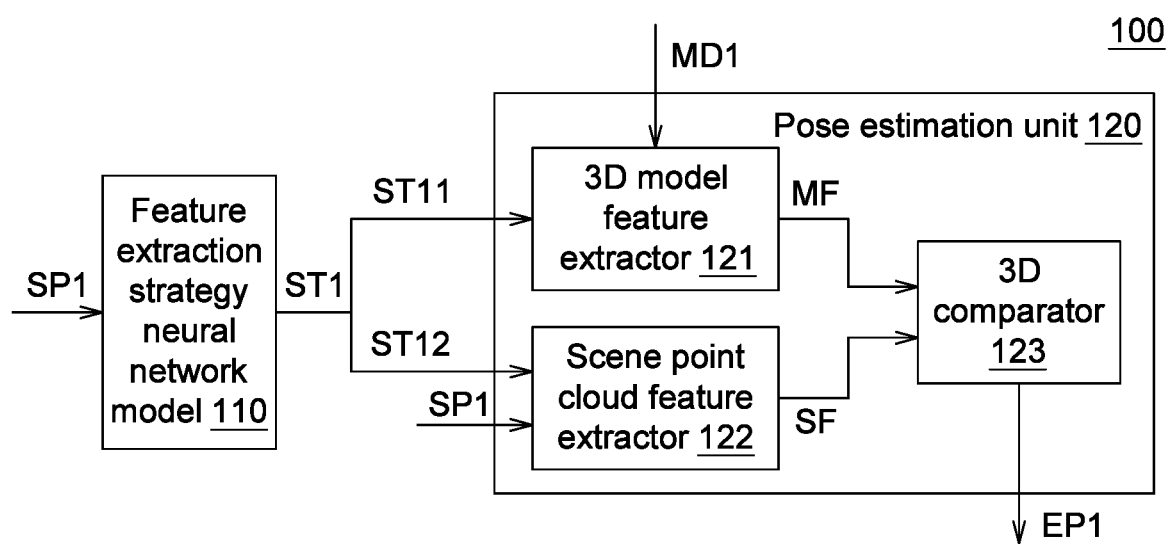
FIG. 9 is a block diagram of an object pose estimation system performing the object pose estimation procedure according to an embodiment.

Refer to FIG. 8 and FIG. 9. FIG. 8 is a flowchart of an object pose estimation procedure of an execution method of an object pose estimation system 100 according to an embodiment. FIG. 9 is a block diagram of an object pose estimation system 100 performing the object pose estimation procedure according to an embodiment. Firstly, the procedure begins at step S110, the feature extraction strategy ST1 of the pose estimation unit 120 is determined by the feature extraction strategy neural network model 110 according to the scene point cloud SP1. The feature extraction strategy neural network model 110 could be a VGGNet model or a residual network (ResNet) model. The feature extraction strategy ST1 is a strategy determined by the feature extraction strategy neural network model 110 according to the scene point cloud SP1 rather than a fixed strategy determined by the engineer. The feature extraction strategy ST1 includes a model feature extraction strategy ST11 and a scene feature extraction strategy ST12. The model feature extraction strategy ST11 and the scene feature extraction strategy ST12 could be identical or different. The content of the model feature extraction strategy ST11 and the scene feature extraction strategy ST12 could be a sampling interval, a quantization step size or a search radius. Under the circumstance where the scene is complicated or the objects could be easily confused, the feature extraction strategy ST1 could reduce the sampling interval, the quantization step size or the search radius. Under the circumstance where the noises are plentiful and the discrepancy between the target object and other objects is huge, the feature extraction strategy ST1 could expand the sampling interval, the quantization step size or the search radius.

Next, the procedure proceeds to step S120, a model feature MF is extracted from the 3D model MD1 of the object OB1 by the 3D model feature extractor 121 of the pose estimation unit 120 according to the model feature extraction strategy ST11 of the feature extraction strategy ST1; and a scene feature SF is extracted from the scene point cloud SP1 by the scene point cloud feature extractor 122 of the pose estimation unit 120 according to the scene feature extraction strategy ST12 of the feature extraction strategy ST1.

Then, the procedure proceeds to step S130, the model feature MF is compared with the scene feature SF by the 3D comparator 123 of the pose estimation unit 120 to obtain an estimated pose EP1 of the object OB1. In the present step, the pose estimation unit 120 does not recognize the estimated pose EP1 using neural network, but obtains the estimated pose EP1 by comparing the model feature MF with the scene feature SF. For example, the pose estimation unit 120 could obtain the estimated pose EP1 using a point-pair feature (PPF) algorithm, a viewpoint feature histogram (VFH) algorithm, a signature of histograms of orientations (SHOT) algorithm, a radius-based surface descriptor (RSD) algorithm, or a point feature histogram (PFH) algorithm. In an embodiment, if several objects OB1 are found in the scene point cloud SP1, many estimated poses EP1 will be outputted. The estimated pose EP1 includes the 6-degree-of-freedom (6-DoF) 3D space position and orientation of the object OB1. After obtaining the estimated pose EP1, the robot arm AM1 could accurately grasp the object OB1 according to the 6-DoF 3D space position and orientation.

According to the object pose estimation procedure of the above embodiments, since the feature extraction strategy ST1 could be quickly determined according to the scene point cloud SP1, suitable model features MF and suitable scene features SF could be quickly obtained without affecting the estimation accuracy or adding too much computational burden.

Figure 10:
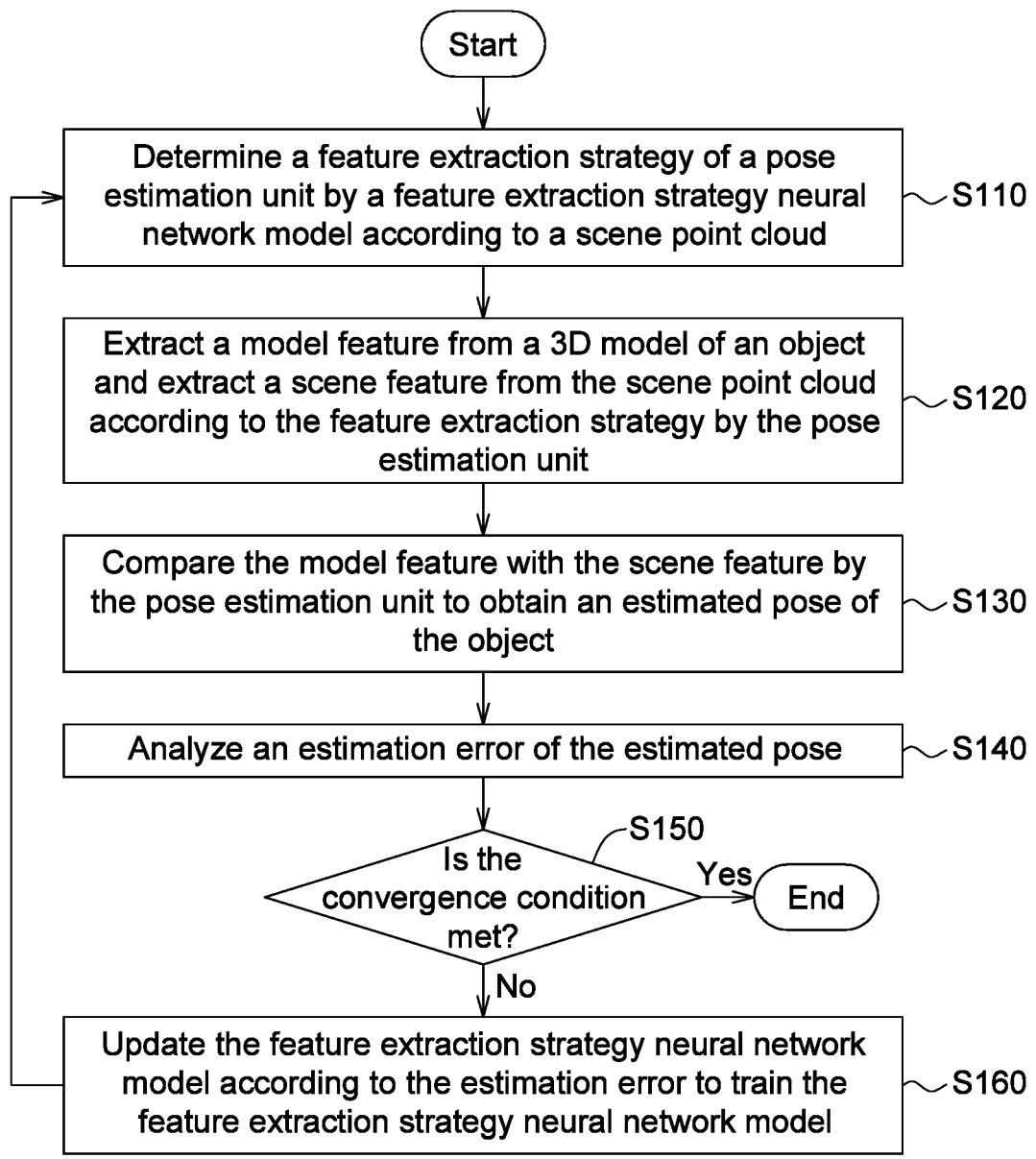
FIG. 10 is a flowchart of a back-tracing training procedure of an execution method of an object pose estimation system according to an embodiment.
Figure 11:
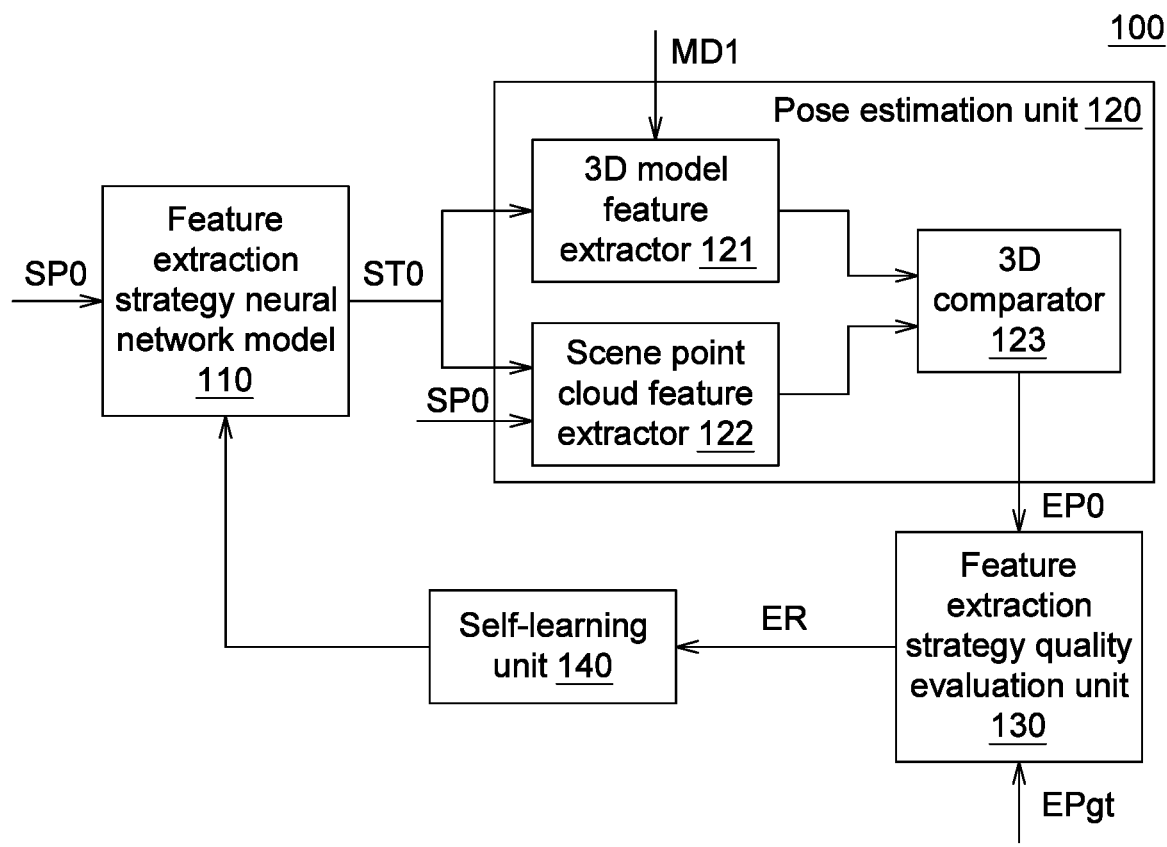
FIG. 11 is a block diagram of an object pose estimation system performing a back-tracing training procedure according to an embodiment.

Refer to FIG. 10 and FIG. 11. FIG. 10 is a flowchart of a training procedure of an execution method of an object pose estimation system 100 according to an embodiment. FIG. 11 is a block diagram of an object pose estimation system 100 performing a training procedure according to an embodiment. Steps S110 to S130 of the training procedure are similar to steps S110 to S130 of the object pose estimation procedure. The training procedure is different from the object pose estimation procedure in that the pose of the object OB1 of the scene point cloud SP0 is known. The scene point cloud SP0 could arrange the objects OB1 according to the predetermined pose to create a scene point cloud. Or, the scene point cloud SP0 could generate a scene point cloud according to the predetermined pose through simulation. Regardless of which method is used, the pose of the object OB1 of the scene point cloud SP0 is known.

After steps S110 to S130 are completed, the pose estimation unit 120 outputs an estimated pose EP0. Then, the procedure proceeds to step S140, an estimation error ER of the estimated pose EP0 is analyzed by the feature extraction strategy quality evaluation unit 130. In the present step, the feature extraction strategy quality evaluation unit 130 analyzes the estimation error ER by comparing the estimated pose EP0 with a known pose EPgt. The known pose EPgt is a ground truth for machine learning and is already known when the scene point cloud SP0 is established or generated. For example, the feature extraction strategy quality evaluation unit 130 analyzes the estimation error ER according to a visible surface discrepancy (VSD) or an average distance of model points (ADI).

Then, the procedure proceeds to step S150, whether the training procedure meets a convergence condition is determined by the self-learning unit 140. The convergence condition could be set as: the estimation error ER is smaller than a predetermined value or the reduction in the estimation error ER is smaller than a predetermined value or the iteration number reaches a predetermined number. If the training procedure does not meet the convergence condition, then the procedure proceeds to step S160.

In step S160, the feature extraction strategy neural network model 110 is updated by the self-learning unit 140 according to the estimation error ER to train the feature extraction strategy neural network model 110. The self-learning unit 140 updates the feature extraction strategy neural network model 110 using a soft actor-critic (SAC) algorithm, a deep deterministic policy gradient (DDPG) algorithm, a deep Q network (DON) algorithm, an asynchronous advantage actor-critic (A3C) algorithm, or a proximal policy optimization (PPO) algorithm.

Then, the procedure returns to step S110, and steps S110 to S130 are performed again to update the feature extraction strategy ST0. Then, the updated estimated pose EP0 will be obtained after steps S120 and step S130 are completed. This process is repeated until the training procedure meets the convergence condition, that is, the training of the feature extraction strategy neural network model 110 is completed. When the training is completed, the train feature extraction strategy neural network model 110 could determine the best feature extraction strategy ST0 of the pose estimation unit 120 for the scene point cloud SP0.

The above training procedure is performed according to individual scene point cloud, such that the feature extraction strategy neural network model 110 could determine the best feature extraction strategy for each scene point cloud and that the dependence on professional image engineer could be reduced.

Figure 12:
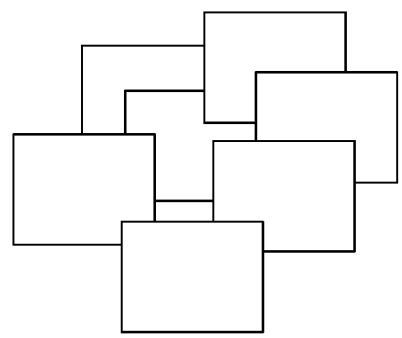
FIGS. 12 to 14 are schematic diagrams of scenes according to different embodiments.
Figure 13:
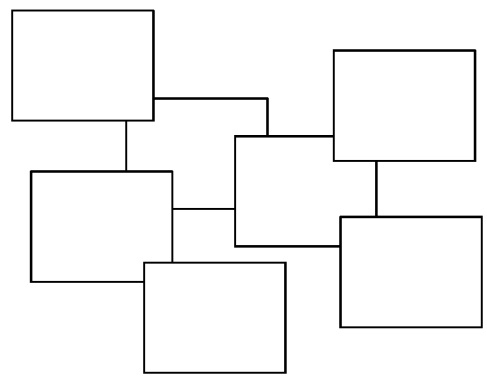
Figure 14:
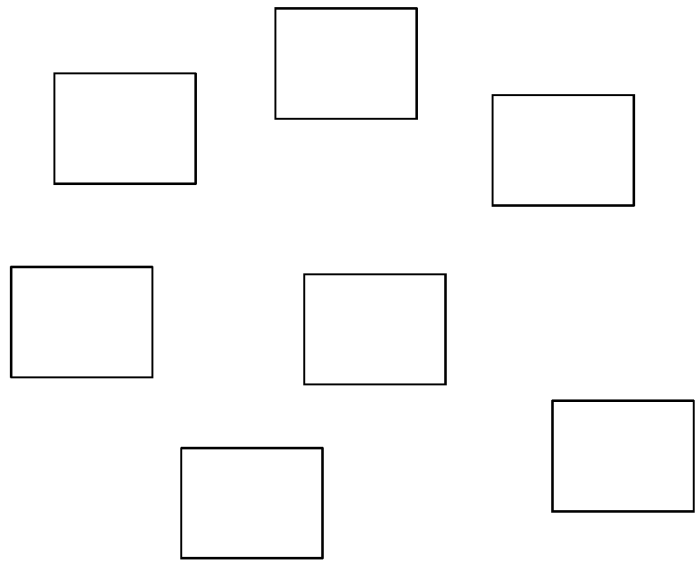

In the object pose estimation procedure of FIG. 8, the feature extraction strategy ST1 determined by the feature extraction strategy neural network model 110 is not obtained through simple heuristics or ordinary statistical or mathematical calculation. Referring to FIGS. 12 to 14, schematic diagrams of scene SN5, SN6 and SN7 according to different embodiments are shown. Suppose the 3D camera could perfectly capture the scene point cloud. Since the computation time required in the object pose estimation procedure is relevant to the size of the sampling interval of the feature extraction strategy ST1, the denser the sampling interval, the higher the computational complexity and the longer the computation time. To assure comparison success, when the scene SN5 has a high stacking complexity, the sampling interval needs to be dense; conversely, when the scene SN7 has a low stacking complexity, the sampling interval could be sparse.

When the stacking complexity is high, the feature extraction strategy neural network model 110 determines that the feature extraction strategy ST1 needs to adopt a dense sampling interval. When the stacking complexity is low, the feature extraction strategy neural network model 110 determines that the feature extraction strategy ST1 could adopt a sparse sampling interval. Thus, the feature extraction strategy ST1 could be dynamically adjusted according to the complexity of the scene.

Figure 15:
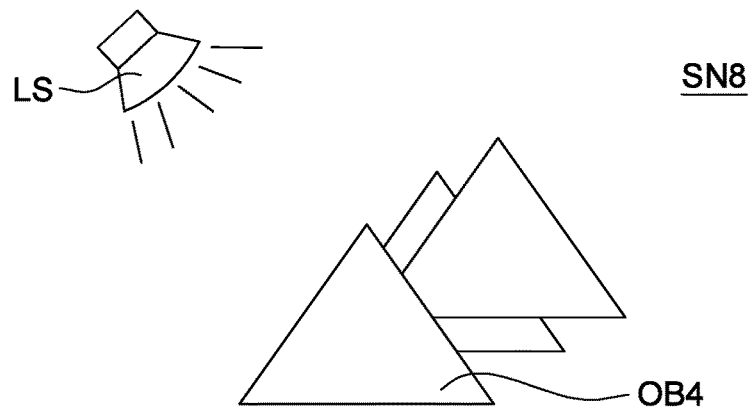
FIGS. 15 to 17 are schematic diagrams of scenes according to different embodiments.
Figure 16:
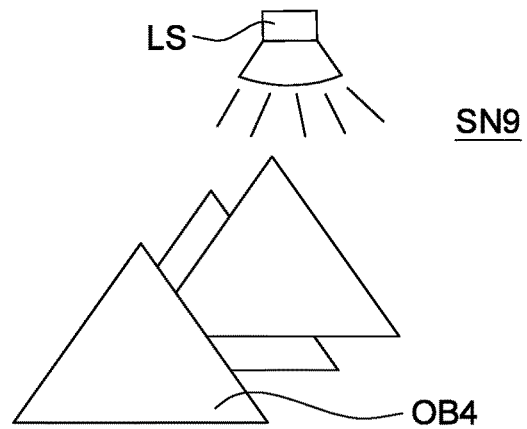
Figure 17:
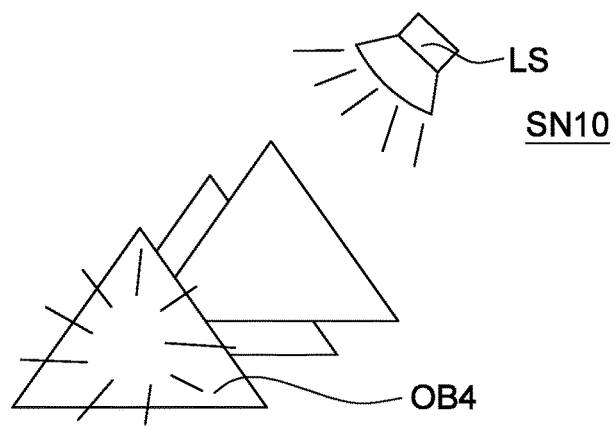

Referring to FIGS. 15 to 17, schematic diagrams of scenes SN8, SN9 and SN10 according to different embodiments are shown. Under the circumstance that the 3D camera has noises, the scene point cloud captured by the 3D camera will be affected by factors such as the ambient light, the material of the object surface and the camera location. Therefore, at different time points or when the object poses and the stacking situations change, the features of the noises existing in the scene point cloud are not identical. Under such circumstances, relevant principles of signal processing (or image processing) indicate that when signals are corrupted by noise, an aliasing effect may occur if an improper sampling interval is adopted (for example, the feature extraction strategy ST1 adopts a sparse sampling interval).

That is, when the frequency of the noises and the frequency of the signals are mixed, the noises will affect the post-processing results of signals to a larger extent.

Therefore, through the arrangement of setting the sampling interval of the feature extraction strategy ST1 to a sparse sampling interval (it is like applying a low pass filter on the signals with noises) before the following signal analysis is performed, the influence caused by noises could be reduced, and the comparison result could be more accurate.

However, if the sampling interval is too sparse, the original signal messages may be lost. Therefore, under the circumstance that noise influence exists, the setting of the sampling interval is not as simple as: the denser the better or the sparser the better. Rather, there is an optimum trade-off between reduction in noise influence and reservation of messages, and the feature extraction strategy ST1 needs to be dynamically adjusted.

As indicated in FIGS. 15 to 17, the arrangements of the objects are identical, but the positions of the light source LS are different. The object OB4 reflects the light in FIG. 17 but not in FIG. 15. The factors of light reflection include the position and orientation of the light source LS as well as the reflective feature of the surface material of the object OB4. Since the 3D camera has different noise behavior in the scenes SN8, SN9 and SN10, the setting of the sampling interval corresponding to the feature extraction strategy ST1 needs to be dynamically adjusted.

Figure 18:
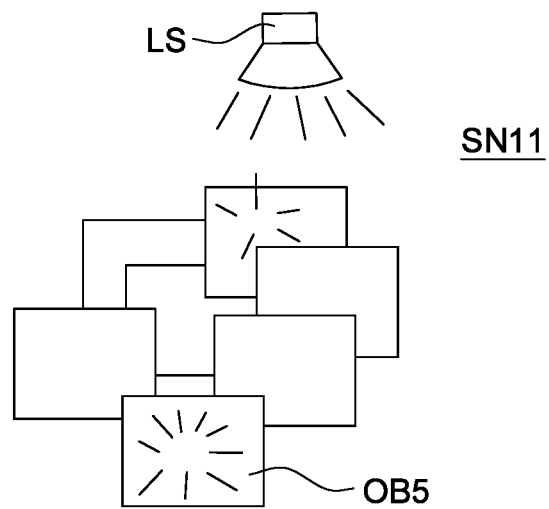
FIGS. 18 to 20 are schematic diagrams of scenes according to different embodiments.
Figure 19:
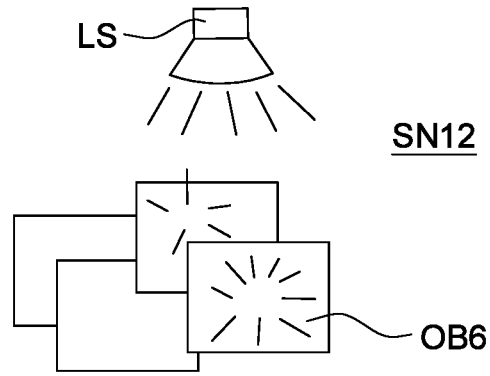
Figure 20:
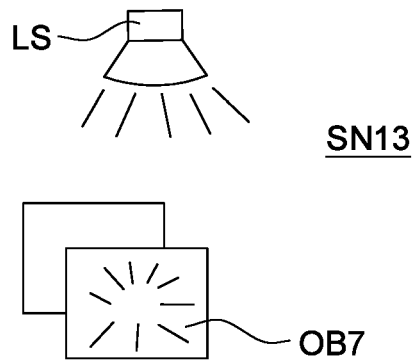

Referring to FIGS. 18 to 20, schematic diagrams of scene SN11 SN12 and SN13 according to different embodiments are shown. Scenes SN11, SN12 and SN13 are different scenes varying with the object grasping process. The factors, which affect the noises of the objects OB5, OB6 and OB7 at 3 time points, include an object blocking relationship and a reflective relationship between the object and the light source LS. As the object blocking relationship changes, the reflective relationship between the object and the light source LS also changes. Since the 3D camera has different noise behavior for the scenes SN8, SN9 and SN10, the setting of the sampling interval corresponding to the feature extraction strategy ST1 needs to be dynamically adjusted.

Figure 21:
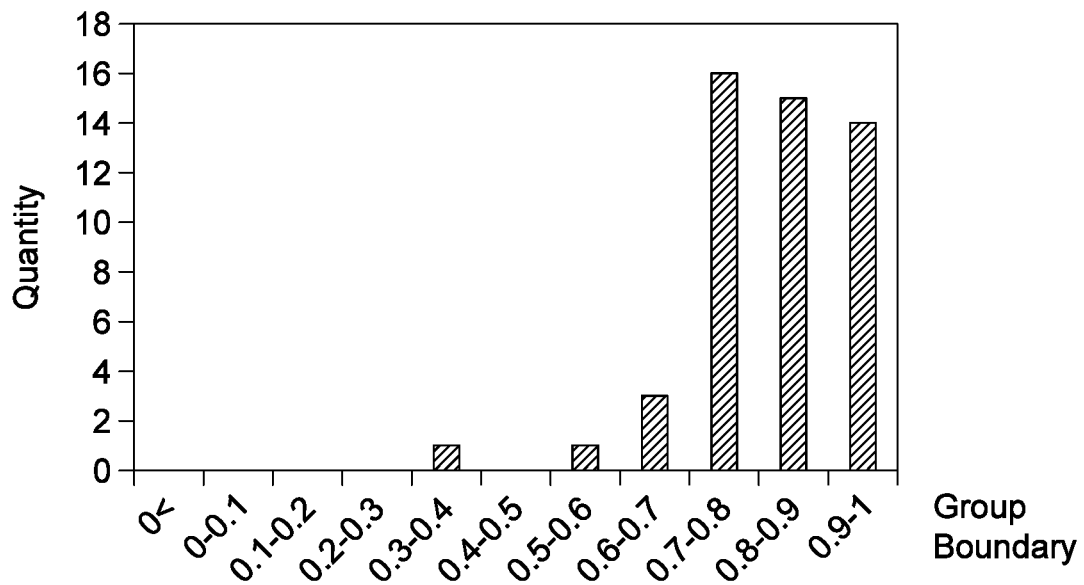
FIG. 21 is a result of an object pose estimation procedure adopting a fixed feature extraction strategy.
Figure 22:
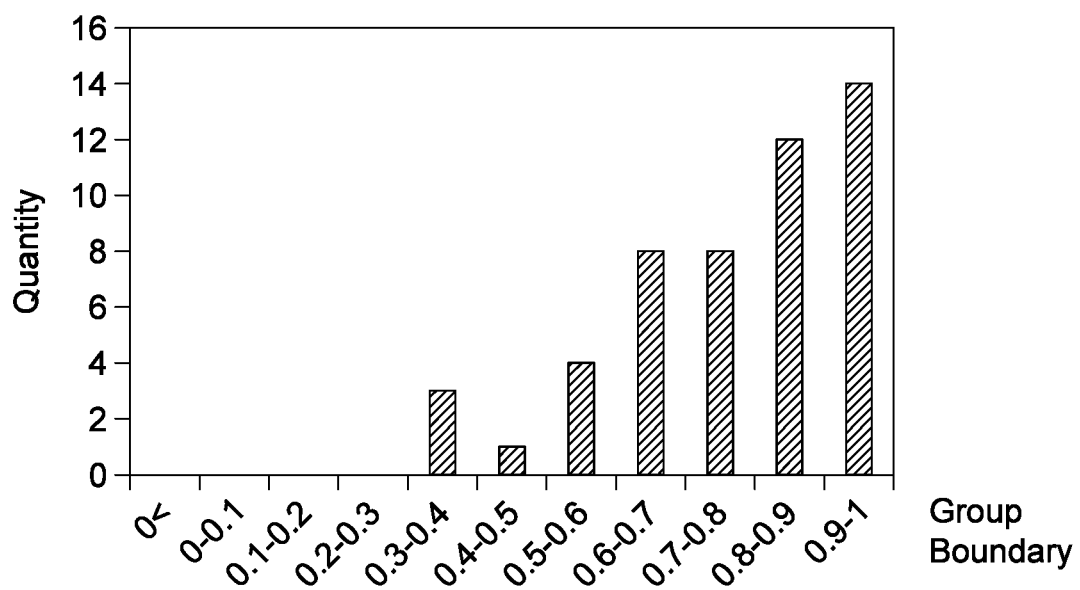
FIG. 22 is a result of an object pose estimation procedure adopting a dynamically adjusted feature extraction strategy.

Refer to FIGS. 21 to 22. FIG. 21 is a result of an object pose estimation procedure adopting a dynamically adjusted feature extraction strategy. FIG. 22 is a result of an object pose estimation procedure adopting a fixed feature extraction strategy. Both experimental groups use the collected physical water-tap data set, which contains 50 data items in total. The scenes of the 50 data items are not identical. The experimental result of FIG. 22 is obtained by applying a fixed feature extraction strategy on the 50 data items. The experimental result of FIG. 21 is obtained by applying a dynamically adjusted feature extraction strategy on the 50 data items. The horizontal axis represents comparison score, and an object pose with a comparison score greater than 0.7 indicates that the object pose could be correctly recognized. The two experimental groups show that the fixed feature extraction strategy could recognize 74% of object poses, and the dynamically adjusted feature extraction strategy could recognize 90% of object poses. Therefore, the dynamically adjusted feature extraction strategy indeed produces a better result.

Figure 23:
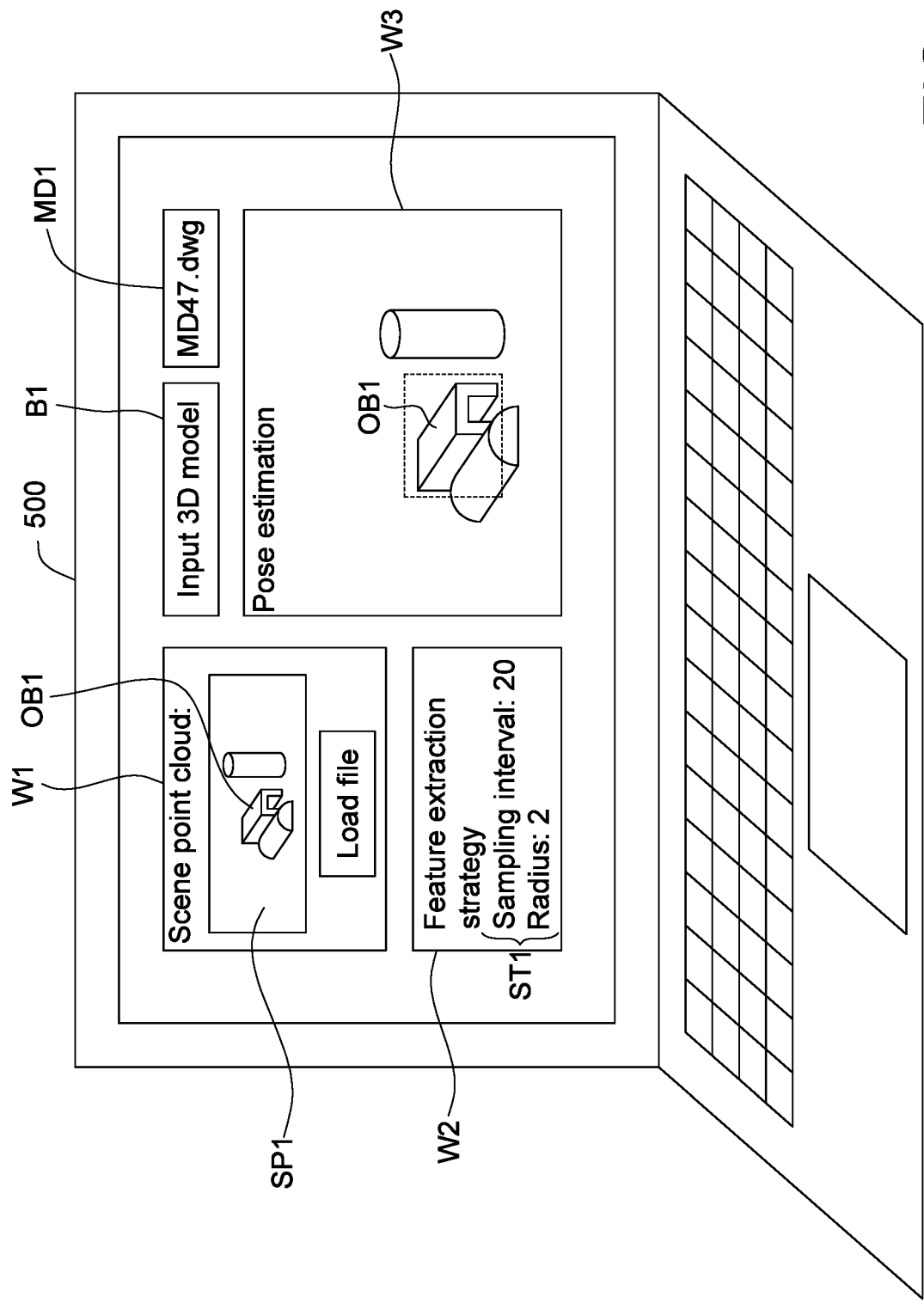
FIG. 23 is a schematic diagram of a graphic user interface of an object pose estimation system according to an embodiment.

The object pose estimation system 100 of the present embodiment could further be developed as a software package and could provide a graphic user interface for the users. Referring to FIG. 23, a schematic diagram of a graphic user interface 500 of an object pose estimation system 100 according to an embodiment is shown. The graphic user interface 500 includes a scene point cloud input window W1, a feature extraction strategy determination window W2, a 3D model input button B1 and an estimated pose display window W3, The scene point cloud input window W1 is used for the input of the scene point cloud SP1. According to the scene point cloud SP1, the feature extraction strategy neural network model 110 (illustrated in FIG. 7) determines the feature extraction strategy ST1 of the pose estimation unit 120 (illustrated in FIG. 7) and displays the feature extraction strategy ST1 on the feature extraction strategy determination window W2. The 3D model input button B1 is used for the input of the 3D model MD1 of the object OB1. According to the feature extraction strategy ST1, the model feature is extracted from the 3D model MD1 and the scene feature is extracted from the scene point cloud SP1. The estimated pose (marked by dotted lines) of the object OB1 is displayed on the estimated pose display window W3. The estimated pose is obtained by comparing the model feature with the scene feature.

According to the above embodiments, the object pose estimation system 100 could perform an on-line object pose estimation procedure adopting the feature extraction strategy neural network model 110 and the pose estimation unit 120. During the object pose estimation procedure, different feature extraction strategies ST1 could be quickly adopted for different scenes. Besides, the object pose estimation system 100 could also perform an off-fine training procedure on the feature extraction strategy neural network model 110 using the feature extraction strategy quality evaluation unit 130 and the self-learning unit 140, such that the feature extraction strategy neural network model 110 could provide a most suitable feature extraction strategy ST1.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. An execution method of an object pose estimation system, comprising:
   determining a feature extraction strategy of a pose estimation unit by a feature extraction strategy neural network model according to a scene point cloud;
   according to the feature extraction strategy, extracting a model feature from a 3D model of an object and extracting a scene feature from the scene point cloud by the pose estimation unit; and
   comparing the model feature with the scene feature by the pose estimation unit to obtain an estimated pose of the object;
   wherein the feature extraction strategy comprises a model feature extraction strategy and a scene feature extraction strategy, and the pose estimation unit includes a 3D model feature extractor and a scene point cloud feature extractor;
   the model feature is extracted, by the 3D model feature extractor, from the 3D model according to the model feature extraction strategy; and
   the scene feature is extracted, by the scene point cloud feature extractor, from the scene point cloud according to the scene feature extraction strategy.

2. The execution method of the object pose estimation system according to claim 1, wherein the feature extraction strategy comprises a model feature extraction strategy and a scene feature extraction strategy.

3. The execution method of the object pose estimation system according to claim 2, wherein the model feature extraction strategy is different from the scene feature extraction strategy.

4. The execution method of the object pose estimation system according to claim 1, wherein the feature extraction strategy is a sampling interval, a quantization step size or a search radius.

5. The execution method of the object pose estimation system according to claim 1, wherein the feature extraction strategy neural network model is a VGGNet model or a residual network (ResNet) model.

6. The execution method of the object pose estimation system according to claim 1, wherein the pose estimation unit obtains the estimated pose using a point-pair feature (PPF) algorithm, a viewpoint feature histogram (VFH) algorithm, a signature of histograms of orientations (SHOT) algorithm, a radius-based surface descriptor (RSD) algorithm, or a point feature histogram (PFH) algorithm.

7. The execution method of the object pose estimation system according to claim 1, further comprising:
analyzing an estimation error of the estimated pose; and
updating the feature extraction strategy neural network model according to the estimation error to train the feature extraction strategy neural network model.

8. The execution method of the object pose estimation system according to claim 7, wherein in the step of analyzing the estimation error of the estimated pose, the estimated pose is compared with a known pose to analyze the estimation error.

9. The execution method of the object pose estimation system according to claim 7, wherein the estimation error is analyzed according to a visible surface discrepancy (VSD) or an average distance of model points (ADI).

10. The execution method of the object pose estimation system according to claim 7, wherein the feature extraction strategy neural network model is updated using a soft actor-critic (SAC) algorithm, a deep deterministic policy gradient (DDPG) algorithm, a deep Q network (DQN) algorithm, an asynchronous advantage actor-critic (A3C) algorithm, or a proximal policy optimization (PPO) algorithm.

11. The execution method of the object pose estimation system according to claim 7, wherein the feature extraction strategy neural network model is further updated according to a computational complexity to train the feature extraction strategy neural network model.

12. An object pose estimation system, comprising:
a feature extraction strategy neural network model configured to determine a feature extraction strategy of a pose estimation unit according to a scene point cloud; and
the pose estimation unit, configured to extract a model feature from a 3D model of an object, extract a scene feature from the scene point cloud and compare the model feature with the scene feature according to the feature extraction strategy to obtain an estimated pose of the object;
wherein the feature extraction strategy comprises a model feature extraction strategy and a scene feature extraction strategy, and the pose estimation unit comprises:
a 3D model feature extractor, configured to extract the model feature from the 3D model according to the model feature extraction strategy; and
a scene point cloud feature extractor, configured to extract the scene feature from the scene point cloud according to the scene feature extraction strategy.

13. The object pose estimation system according to claim 12, wherein the model feature extraction strategy is different from the scene feature extraction strategy.

14. The object pose estimation system according to claim 12, wherein the feature extraction strategy is a sampling interval, a quantization step size or a search radius.

15. The object pose estimation system according to claim 12, wherein the feature extraction strategy neural network model is a VGGNet model or a residual network (ResNet) model.

16. The object pose estimation system according to claim 12, wherein the pose estimation unit comprises:
a 3D comparator, configured to obtain the estimated pose using a point-pair feature (PPF) algorithm, a viewpoint feature histogram (VFH) algorithm, a signature of histograms of orientations (SHOT) algorithm, a radius-based surface descriptor (RSD) algorithm, or a point feature histogram (PFH) algorithm.

17. The object pose estimation system according to claim 12, further comprising:
a feature extraction strategy quality evaluation unit, configured to analyze an estimation error of the estimated pose; and
a self-learning unit, configured to update the feature extraction strategy neural network model according to the estimation error to train the feature extraction strategy neural network model.

18. The object pose estimation system according to claim 17, wherein the feature extraction strategy quality evaluation unit compares the estimated pose with a known pose to analyze the estimation error.

19. The object pose estimation system according to claim 17, wherein the feature extraction strategy quality evaluation unit analyzes the estimation error according to a visible surface discrepancy (VSD) or an average distance of model points (ADI).

20. The object pose estimation system according to claim 17, wherein the self-learning unit updates the feature extraction strategy neural network model using a soft actor-critic (SAC) algorithm, a deep deterministic policy gradient (DDPG) algorithm, a deep Q network (DQN) algorithm, an asynchronous advantage actor-critic (A3C) algorithm, or a proximal policy optimization (PPO) algorithm.

21. The object pose estimation system according to claim 17, wherein the self-learning unit further updates the feature extraction strategy neural network model according to a computational complexity to train the feature extraction strategy neural network model.

22. A graphic user interface, comprising:
a scene point cloud input window used for showing a scene point cloud;
a feature extraction strategy determination window, on which a feature extraction strategy of a pose estimation unit determined by a feature extraction strategy neural network model according to a scene point cloud is displayed;
a 3D model input button used for inputting a 3D model of an object, wherein a model feature is extracted from the 3D model and a scene feature is extracted from the scene point cloud according to the feature extraction strategy; and
an estimated pose display window used for displaying an estimated pose of the object obtained by comparing the model feature with the scene feature;
wherein the feature extraction strategy comprises a model feature extraction strategy and a scene feature extraction strategy, and the pose estimation unit comprises:

a 3D model feature extractor, configured to extract the model feature from the 3D model according to the model feature extraction strategy; and
a scene point cloud feature extractor, configured to extract the scene feature from the scene point cloud according to the scene feature extraction strategy.

* * * * *